(12) United States Patent
Tan et al.

(10) Patent No.: US 10,080,194 B2
(45) Date of Patent: Sep. 18, 2018

(54) METHOD, DEVICE, AND COMPUTER-READABLE STORAGE MEDIUM FOR AWAKING ELECTRONIC EQUIPMENT

(71) Applicant: Xiaomi Inc., Beijing (CN)

(72) Inventors: Kangxi Tan, Beijing (CN); Li He, Beijing (CN); Xiaohe Yang, Beijing (CN)

(73) Assignee: Xiaomi Inc., Beijing (CN)

( * ) Notice: Subject to any disclaimer, the term of this patent is extended or adjusted under 35 U.S.C. 154(b) by 8 days.

(21) Appl. No.: 15/091,837

(22) Filed: Apr. 6, 2016

(65) Prior Publication Data

US 2017/0064629 A1    Mar. 2, 2017

(30) Foreign Application Priority Data

Aug. 31, 2015  (CN) .......................... 2015 1 0549467

(51) Int. Cl.
H04W 52/02        (2009.01)
H04W 24/08        (2009.01)

(52) U.S. Cl.
CPC ....... *H04W 52/0235* (2013.01); *H04W 24/08* (2013.01); *H04W 52/028* (2013.01); *H04W 52/0229* (2013.01); *Y02D 70/00* (2018.01); *Y02D 70/142* (2018.01); *Y02D 70/144* (2018.01); *Y02D 70/166* (2018.01)

(58) Field of Classification Search
None
See application file for complete search history.

(56) References Cited

U.S. PATENT DOCUMENTS

| 8,014,832 B1 * | 9/2011 | Garrabrant ............ H04W 48/16 455/574 |
| 2007/0268114 A1 | 11/2007 | Enenkl |
| 2008/0268880 A1 * | 10/2008 | Ong .................. H04W 52/0235 455/466 |

(Continued)

FOREIGN PATENT DOCUMENTS

| CN | 101416401 A | 4/2009 |
| CN | 101847183 A | 9/2010 |

(Continued)

OTHER PUBLICATIONS

Office Action issued by the Russian Patent Office dated May 15, 2017, in counterpart Russian Patent Application No. 2016107523/07.

(Continued)

*Primary Examiner* — Mohammad S Adhami
(74) *Attorney, Agent, or Firm* — Finnegan, Henderson, Farabow, Garrett & Dunner LLP

(57) ABSTRACT

A method, device, and computer-readable storage medium for awaking electronic equipment. The method for awaking the electronic equipment includes monitoring whether a first processor needs to be awaked, when the first processor is powered off; and controlling a power supply module to supply power to the first processor to awake the first processor, if the first processor needs to be awaked. The monitoring whether the first processor needs to be awaked can be performed by a wireless module included in the electronic equipment, rather than by an additional Microcontroller Unit (MCU).

12 Claims, 8 Drawing Sheets

(56) References Cited

U.S. PATENT DOCUMENTS

| | | | |
|---|---|---|---|
| 2011/0285514 A1* | 11/2011 | Feng | G08C 17/02 340/12.5 |
| 2012/0309295 A1* | 12/2012 | Maguire | H02J 17/00 455/39 |
| 2013/0012129 A1 | 1/2013 | Shibata et al. | |
| 2013/0017869 A1* | 1/2013 | Matson | G06F 1/3203 455/574 |
| 2013/0109323 A1* | 5/2013 | Ruutu | H04B 5/0031 455/68 |
| 2013/0157637 A1 | 6/2013 | Bos | |
| 2014/0064166 A1* | 3/2014 | HomChaudhuri | H04W 52/0216 370/311 |
| 2016/0374043 A1* | 12/2016 | Wetterwald | H04W 4/005 |

FOREIGN PATENT DOCUMENTS

| | | |
|---|---|---|
| CN | 202075687 U | 12/2011 |
| CN | 102483647 A | 5/2012 |
| CN | 101847183 B | 11/2013 |
| CN | 105159675 A | 12/2015 |
| EP | 2 348 405 A1 | 7/2011 |
| JP | 2001-109920 A | 4/2001 |
| JP | 2001-168879 A | 6/2001 |
| JP | 2001-184149 A | 7/2001 |
| JP | 2002-55825 A | 2/2002 |
| JP | 2004-38295 A | 2/2004 |
| JP | 2006-235968 A | 9/2006 |
| JP | 2012-230490 A | 11/2012 |
| KR | 10-2009-0039813 A | 4/2009 |
| KR | 20100048058 A | 5/2010 |
| KR | 10-2014-0027875 A | 3/2014 |
| KR | 10-2015-0024234 A | 3/2015 |
| RU | 2488241 C2 | 7/2013 |
| WO | WO 2011/048658 A1 | 4/2011 |

OTHER PUBLICATIONS

Office Action issued by the Korean Patent Office dated Feb. 20, 2017 in counterpart Korean Application No. 10-2016-7005312.
European Search Report issued by the European Patent Office dated Jan. 16, 2017 in counterpart European Application No. 16162350.9-1875.
International Search Report issued by the State Intellectual Property Office of the People's Republic of China dated Jun. 1, 2016 for International Application No. PCT/CN2015/099290.
Korean Notice of Allowance for Korean Application No. 10-2016-7005312, dated Nov. 21, 2017.

* cited by examiner

METHOD, DEVICE, AND COMPUTER-READABLE STORAGE MEDIUM FOR AWAKING ELECTRONIC EQUIPMENT

CROSS-REFERENCE TO RELATED APPLICATION

This application is based on and claims priority to Chinese Patent Application No. 201510549467.6 filed on Aug. 31, 2015, which is incorporated herein by reference in its entirety.

FIELD

The present disclosure generally relates to control of equipment and, more particularly, to a method, device and computer-readable storage medium for awaking electronic equipment.

BACKGROUND

In existing wireless communication equipment, a wireless module is typically controlled by a main system Central Processing Unit (CPU) of the wireless communication equipment to transmit or receive data. After the main system CPU of the wireless communication equipment is shut down, which generally means cutting off a power supply for the main system CPU by pressing a physical button on the wireless communication equipment, the wireless module is powered off and is unable to work correspondingly. As a result, the wireless module cannot awake the main system.

In related art, existing CPUs are architecturally designed to each connect with a low-power and low-speed Microcontroller Unit (MCU). The MCU may run at a low speed when the electronic equipment is shut down or sleeping, in order to awake the CPU when an externally inputted control signal is received. Therefore in related art, the MCU needs be included, resulting in increased costs and waste of resources.

SUMMARY

According to a first aspect of the present disclosure, a method for awaking electronic equipment, including a wireless module connected with a first processor and a power supply module, is provided. The method includes monitoring, by the wireless module, whether the first processor needs to be awaked, when the first processor is powered off; and controlling by the wireless module, the power supply module to supply power to the first processor to awake the first processor, if the first processor needs to be awaked.

According to a second aspect of the present disclosure, a wireless module included in electrical equipment is provided. The electrical equipment may further include a first processor and a power supply module. The wireless module may include a second processor and a memory for storing instructions executable by the second processor. The second processor is configured to: monitor whether the first processor needs to be awaked, when the first processor is powered off; and control the power supply module to supply power to the first processor to awake the first processor, if the first processor needs to be awaked.

According to a third aspect of the present disclosure, a non-transitory computer-readable storage medium having instructions stored thereon is provided. The instructions when executed by a second processor of a wireless module connected with a first processor and a power supply module in electronic equipment, cause the second processor to perform the above method for awaking the electronic equipment.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1A:
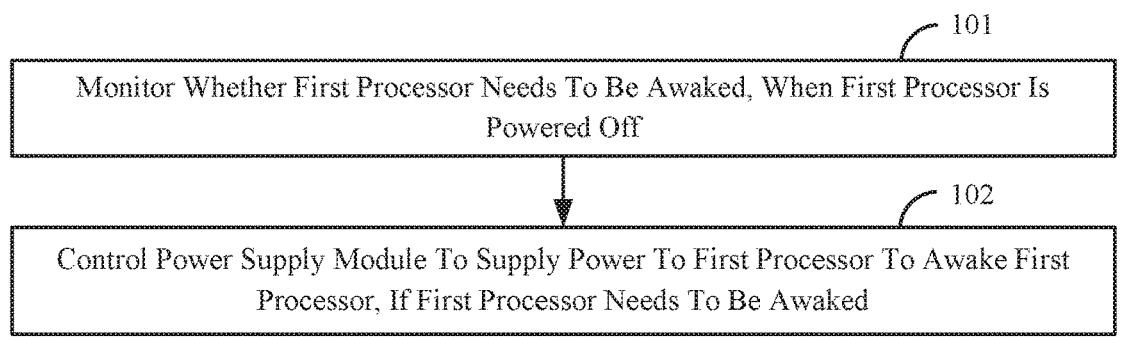
FIG. 1A is a flow chart illustrating a method for awaking electronic equipment according to an exemplary embodiment.

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of devices and methods consistent with aspects related to the invention as recited in the appended claims.

Terms used in the disclosure are only for purpose of describing particular embodiments, and are not intended to limit the disclosure. "A", "said" and "the" used in singular form in the disclosure and appended claims are intended to include a plural form, unless the context explicitly indicates otherwise. It is to be understood that the term "and/or" used in the description may mean and include any or all combinations of one or more associated and listed terms.

It is to be understood that, although the disclosure may use terms, such as, "first", "second" and "third" to describe various information, the information should not be limited herein. These terms are only used to distinguish information of the same type from each other. For example, first information may also be referred to as second information, and the second information may also be referred to as the first information, without departing from the scope of the disclosure. Based on context, the word "if" used herein may be interpreted as "when", or "while", or "in response to a determination".

Technical solutions of embodiments of the disclosure may provide at least some of the following beneficial effects.

In an embodiment of the disclosure, a wireless module may monitor whether a first processor needs to be awaked, when the first processor is powered off; and if the first processor needs to be awaked, the wireless module may control a power supply module to supply power to the first processor, so as to awake the first processor. In the embodiment, monitoring whether the first processor needs to be awaked can be performed by the wireless module included in the electronic equipment, rather than by an additionally added MCU. Therefore, resource consumption of the equipment is reduced and costs of the equipment are reduced.

In an embodiment of the disclosure, when the electronic equipment is powered up after powered off, or after the electronic equipment is shut down, the wireless module may monitor a first control signal for controlling start of the first processor of the electronic equipment, and may control the first processor of the electronic equipment to start to work normally. In the embodiment, it is not necessary to add an MCU into the electronic equipment; therefore, resource consumption of the equipment is reduced and costs of the equipment are reduced.

In an embodiment of the disclosure, a latest executable file may be sent to the wireless module upon the electronic equipment is shut down or the electronic equipment is re-powered up, and the wireless module may thus be updated and run in a better state.

In an embodiment of the disclosure, when a first control signal of a wireless terminal is received, it can be judged whether the wireless terminal is an associated wireless terminal, and only an associated wireless terminal can awake the first processor. Therefore, security of the electronic equipment is improved.

In an embodiment of the disclosure, identifications of wireless terminals are recorded in a pre-stored list for equipment; whether the first control signal is sent from an associated wireless terminal may be judged based on the identifications of wireless terminals. This approach may be easily implemented and have a high judgment accuracy.

In an embodiment of the disclosure, when the electronic equipment is sleeping, timing may be performed based on a sleep duration sent from the first processor; the first processor may be awaked, when the sleep duration expires or when a second control signal sent from a wireless terminal is received. In the embodiment, a timing function may be performed by the wireless module included in the electronic equipment, rather than by additionally added MCU and timer; therefore, resource consumption of the equipment is reduced and costs of the equipment are reduced.

FIG. 1A is a flow chart illustrating a method for awaking electronic equipment according to an exemplary embodiment. The method may be applied in a wireless module connected with a first processor and a power supply module in the electronic equipment.

Figure 1B:
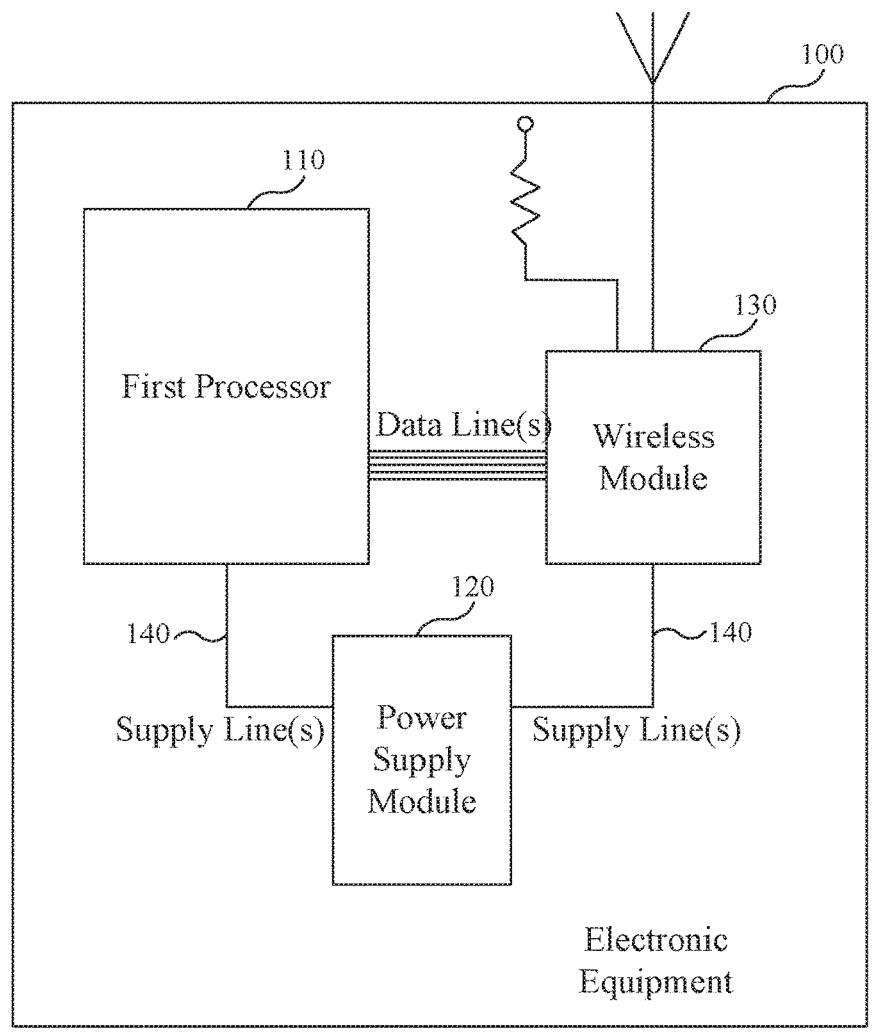
FIG. 1B is a block diagram illustrating electronic equipment according to an exemplary embodiment.

FIG. 1B is a block diagram illustrating electronic equipment 100 according to an exemplary embodiment of the disclosure. The electronic equipment 100 may include a first processor 110, a power supply module 120, and a wireless module 130. The first processor 110 may act as a main processor of the electronic equipment, and is responsible for data processing during the electronic equipment's normal work. In practice, the first processor 110 may be a Central Processing Unit (CPU). The first processor 110 and the wireless module 130 may be connected with the power supply module 120 via supply lines 140, respectively. The power supply module 120 may supply power to the first processor 110 and the wireless module 130. The first processor 110 may also be connected with the wireless module 130. The wireless module 130 is configured to perform the method for awaking the electronic equipment 100 provided by embodiments of the disclosure.

Referring to FIGS. 1A and 1B, in step 101, whether the first processor 110 needs to be awaked is monitored, when the first processor 110 is powered off.

In an embodiment of the disclosure, whether the first processor 110 needs to be awaked may be determined by monitoring whether a first control signal sent from a wireless terminal is received when the electronic equipment 100 is in a powered-off state. For example, when the electronic equipment 100 is powered off while its power plug is plugged in a socket (and thus the electronic equipment 100 may access a power distribution network), a user may start the electronic equipment 100 via a wireless controller or a smart phone associated with the electronic equipment 100.

In an embodiment of the disclosure, when the electronic equipment 100 is sleeping, it may be monitored whether an awaking event occurs or a control signal from a wireless terminal is received. For example, if an alarm clock event is set in the electronic equipment 100, the first processor 110 needs to be awaked to handle the alarm clock event when the alarm clock event occurs. Also for example, the electronic equipment 100 may be configured to activate a camera in the electronic equipment 100 at a certain time to perform a monitoring operation, and the wireless module 130 may awake the first processor 110 at the expiration of the time to activate the camera. As another example, it may be monitored that a user starts the electronic equipment 100 via a wireless controller or a wireless terminal, e.g. a smart phone, associated with the electronic equipment 100.

In step 102, the power supply module 120 is controlled to supply power to the first processor 110, so as to awake the first processor 110, if the first processor 110 needs to be awaked.

In the embodiment, the power supply module 120 may be connected with the first processor 110 and the wireless module 130 via the supply lines 140, respectively. When the wireless module 130 determines that the first processor 110 needs to be awaked, a potential of the supply lines 140 may be pulled up, so that the power supply module 120 supplies power to the first processor 110 to awake the first processor 110.

As can be seen from the above embodiment of the disclosure, the wireless module 130 can monitor whether the first processor 110 needs to be awaked, when the first processor 110 is powered off; and if the first processor 110 needs to be awaked, the wireless module 130 may control the power supply module 120 to supply power to the first processor 110, so as to awake the first processor 110. In the embodiment, monitoring whether the first processor 110 needs to be awaked can be performed by the wireless module 130 included in the electronic equipment 100, rather than by an additionally added MCU. Therefore, resource consumption of the equipment is reduced and costs of the equipment are reduced.

Figure 2A:
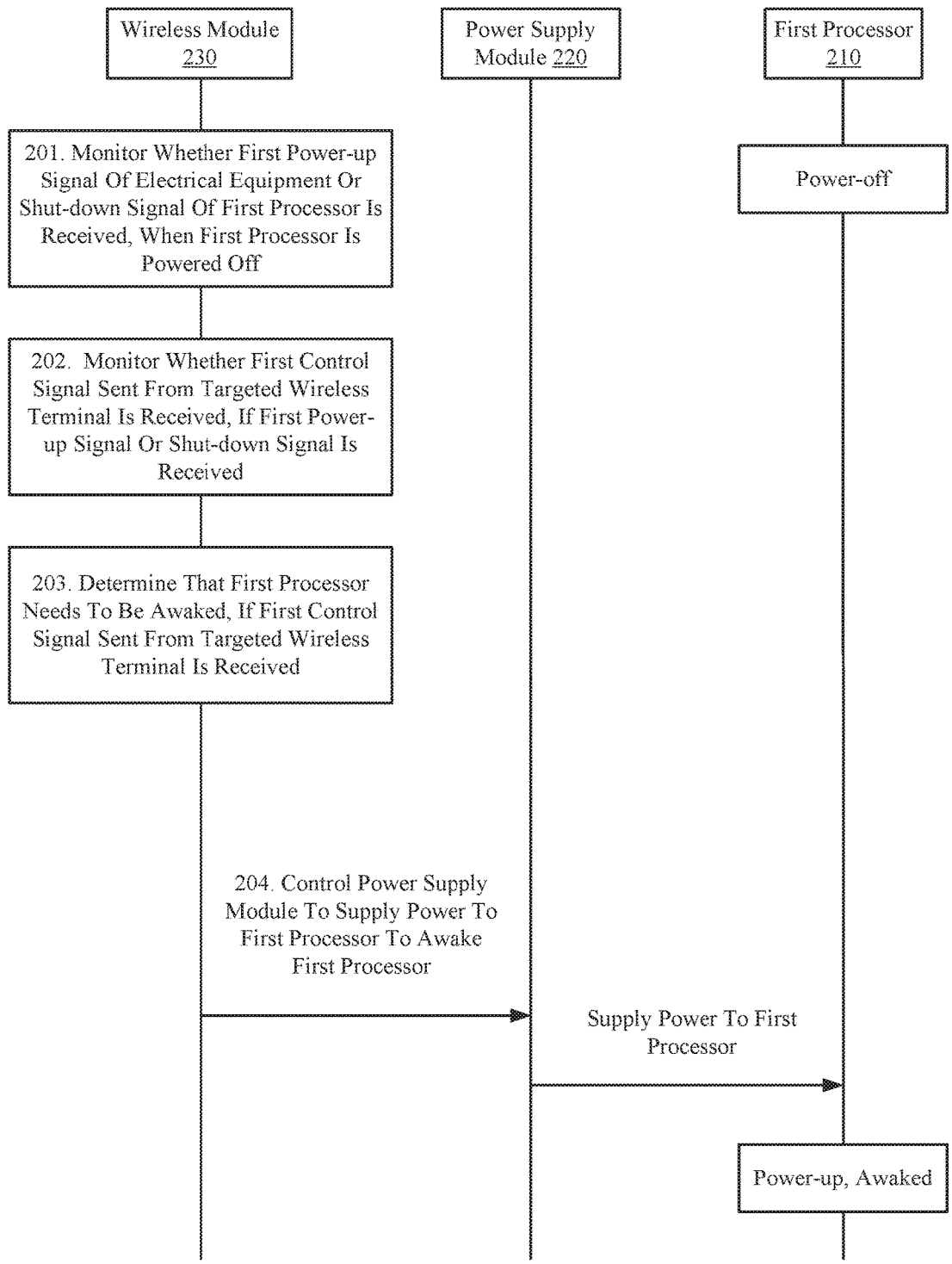
FIG. 2A is a flow chart illustrating another method for awaking electronic equipment according to an exemplary embodiment.

FIG. 2A is a flow chart illustrating another method for awaking electronic equipment according to an exemplary embodiment, which may be applied in a wireless module of the electronic equipment. The method further describes a process on how to monitor whether the first processor needs to be awaked.

Figure 2B:
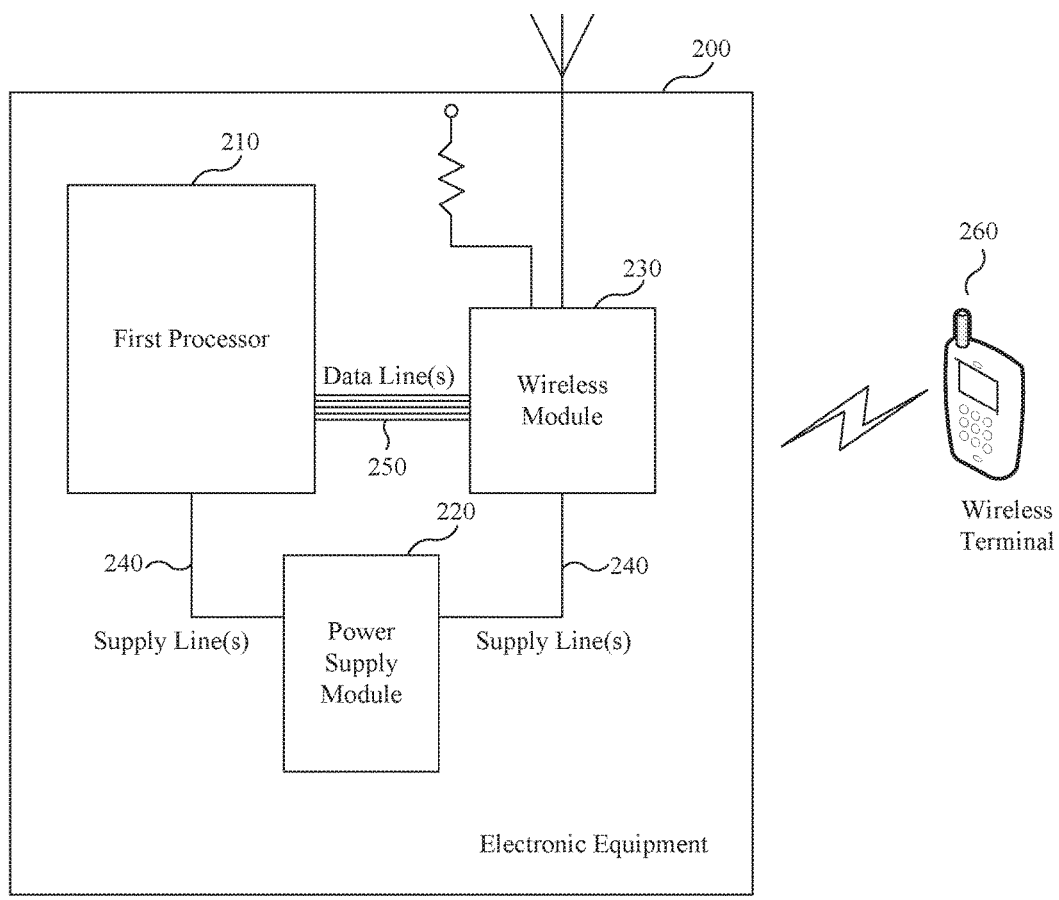
FIG. 2B is a schematic diagram illustrating an application scenario of a method for awaking electronic equipment according to an exemplary embodiment.

FIG. 2B is a schematic diagram illustrating an application scenario where the method for awaking electronic equipment illustrated in FIG. 2A is performed, according to an exemplary embodiment. The diagram shows electronic equipment 200 and a wireless terminal 260. The electronic equipment 200 may include a first processor 210, a power supply module 220, and a wireless module 230. The first processor 210 may act as a main processor of the electronic equipment 200, and is responsible for data processing during the electronic equipment 200's normal work. In practice, the first processor 210 may be a Central Processing Unit (CPU). The first processor 210 and the wireless module 230 may be connected with the power supply module 220 via supply lines 240, respectively. The power supply module 220 may be configured to supply power to the first processor 210 and the wireless module 230. The first processor 210 may also be connected with the wireless module 230. The wireless module 230 is configured to perform the method for awaking the electronic equipment 200 provided by embodiments of the disclosure.

In practice, the wireless module 230 and the first processor 210 are connected via data line(s) 250. When the electronic equipment 200 works normally, the wireless module 230 may receive a control signal sent from the wireless terminal 260, and send the received wireless control signal to the first processor 210, so as to control the electronic equipment 200 according to the control signal sent from the wireless terminal 260. In an embodiment, the wireless module 230 may be a Radio Frequency (RF) transceiver module or a Wireless-Fidelity (WIFI), and so on. Further, the first processor 210 may also be connected with a receiving end and a Reset pin of the wireless module 230 to control restart of the wireless module 230.

Referring to FIGS. 2A and 2B, in step 201, it is monitored whether a first power-up signal of the electronic equipment 200 or a shut-down signal of the first processor 210 is received, when the first processor 210 is powered off.

In step 202, it is monitored whether a first control signal sent from a target wireless terminal is received, if the first power-up signal or the shut-down signal is received. The target wireless terminal may be the wireless terminal 260 in FIG. 2A.

In step 203, it is determined that the first processor 210 needs to be awaked, if the first control signal sent from the target wireless terminal is received.

In step 204, the power supply module 220 is controlled to supply power to the first processor 210, so as to awake the first processor 210.

In the embodiment, the wireless module 230 may be connected with the first processor 210 and thus may capture a shut-down signal of the first processor 210. Or the wireless module 230 may be connected with the power supply module 220 and thus may capture a first power-up signal of the electronic equipment 200.

The wireless module 230 may be designed to have a plurality of awaking modes, such as awaking on power-up (a user may awake the electronic equipment 200 by a wireless terminal when the electronic equipment 200 is connected to a power supply), normal awaking (a user may start the electronic equipment 200 by pressing a power button of the electronic equipment 200), custom awaking (a user may awake the electronic equipment 200 by a wireless terminal, and may specify in advance custom functions that will be automatically activated when the electronic equipment 200 is awaked, such as turning on the screen when the electronic equipment 200 is awaked), and awaking from sleeping (the electronic equipment 200 may be awaked from a sleeping state). In practice, the awaking modes above may be flexibly configured as required.

The wireless module 230 may determine whether the first processor 210 is able to be awaked, by capturing the shut-down signal of the first processor 210 or the first power-up signal of the electronic equipment 200. The first power-up signal of the electronic equipment 200 may be caused by the power distribution network's re-powered up after power-off, or may be caused by a user's pulling out and then plugging in the power plug of the electronic equipment 200.

The wireless module 230 may monitor whether a first control signal sent from a target wireless terminal is received, if the first power-up signal or the shut-down signal is received. The wireless module 230 may determine that the first processor 210 needs to be awaked, if the first control signal sent from the target wireless terminal is received. The first control signal may be generated by the target wireless terminal when detecting that a power button of the target wireless terminal is pressed by a user (this operation means that the user wants to start the electronic equipment 200); upon receiving the first control signal, the wireless module 230 may control the power supply module 220 to supply power to the first processor 210, so as to awake the first processor 210. In practice, a potential of the supply lines 240 may be pulled up so that the power supply module 220 supplies power to the first processor 210, so as to awake the first processor 210.

As can be seen from the above embodiments, in the disclosure, when the electronic equipment 200 is powered up after powered off, or after the electronic equipment 200 is shut down, the wireless module 230 may monitor a first control signal for controlling start of the first processor 210 of the electronic equipment 200, and may control the first processor 210 of the electronic equipment 200 to start and normally work after receiving the first control signal. In this manner, it is not necessarily to add an MCU into the electronic equipment 200; therefore, resource consumption of the equipment is reduced and costs of the equipment are reduced. The electronic equipment 200 is powered off when its power plug is unplugged from a socket. The electronic equipment 200 is shut down when a power supply for a main system CPU of the electronic equipment 200 is cut off by pressing a physical button on the electronic equipment 200.

In an implementation, the operation of monitoring whether the first control signal sent from the targeted wireless terminal is received may include: controlling the power supply module 220 to supply power to the first processor 210; receiving an executable file for a control system of the wireless module 230, sent from the first processor 210 after being supplied with the power; controlling the power supply module 220 to stop supplying power to the first processor 210, after the executable file is received; and updating the control system of the wireless module 230 with the executable file, and monitoring, by the control system of the wireless module 230, whether the first control signal sent from the target wireless terminal is received.

In the embodiment, firmware of the wireless module 230 may be updated when the electronic equipment 200 is powered up or shut down, to solve bugs of the firmware or add new functions to the wireless module 230. For example, when the electronic equipment 200 is powered up (by plugging a power plug of the electronic equipment 200 in a socket), the wireless module 230 is supplied with power, and at this time a processor of the wireless module 230 itself may operate (e.g., the wireless module 230 has a read-only memory (ROM) with default firmware). The wireless module 230 may pull up the potential of the supply lines 240 of the power supply module 220, so that the power supply module 220 may supply power to the first processor 210. As a result, the first processor 210 may start to work and communicate with the wireless module 230 via the data line(s) 250. The first processor 210 may determine that the first processor 210 is in the awaking on power-up mode and may restart the wireless module 230 via a RESET line (the state of the supply lines 240 may not be changed at this time, since the first processor 210 needs to be supplied with power). The first processor 210 may send a latest executable file to the wireless module 230 via the data line(s) 250. The latest executable file may be more up to date than the executable file currently stored in the wireless module 230 and may, for example, solve bugs or implement new functions.

Upon completion of the above actions, the first processor 210 has finished its tasks and may inform the wireless module 230 to power off the first processor 210 via the data line(s) 250. In response to receiving the power-off command, the wireless module 230 may pull down the potential of the supply lines 240 of the wireless module 230 to power off the first processor 210.

Afterwards, the wireless module 230 may monitor whether the first control signal sent from a target wireless terminal is received. The wireless module 230 may control the power supply module 220 to supply power to the first processor 210 upon receiving the first control signal to awake the first processor 210.

In embodiments of the disclosure, the latest executable file may be sent to the wireless module 230 after the electronic equipment 200 is shut down or the electronic equipment 200 is re-powered up; the wireless module 230 may thus be updated and run in a better state.

In another embodiment, the monitoring whether the first control signal sent from a target wireless terminal is received may include: when a first control signal sent from a wireless terminal is received, judging whether the received first control signal is sent from a wireless terminal associated with the electronic equipment 200; and determining that the first control signal sent from the target wireless terminal is received, if the received first control signal is sent from the wireless terminal associated with the electronic equipment 200.

In the embodiment, when the first control signal from the wireless terminal is received, it may be judged whether the wireless terminal is an associated wireless terminal, and only an associated wireless terminal can awake the first processor 210. Therefore, security of the electronic equipment 200 is improved.

The judging whether the received first control signal is sent from the associated wireless terminal may include: acquiring a wireless terminal identification carried in the received first control signal; inquiring whether the wireless terminal identification is recorded in a preset list of equipment; and determining that the received first control signal is sent from the associated wireless terminal, if the wireless terminal identification is recorded in the preset list of equipment.

In the embodiment, a list of equipment may be pre-stored, in which each of associated wireless terminals may be recorded. Identifications of the wireless terminals may be recorded in the list. The identification of a wireless terminal may be a serial number of the wireless terminal, an ID of the wireless terminal, a name of the wireless terminal, a Media Access Control (MAC) address, or anything that may uniquely identify the wireless terminal, which are no limited in embodiments of the disclosure.

In practice, the list of equipment may be sent at the same time as the executable file is sent to the wireless module 230, so that the wireless module 230 may update the list of equipment in time.

In the embodiment, identifications of wireless terminals are recorded in a pre-stored list of equipment, and it may be judged whether the first control signal is sent from an associated wireless terminal based on the identifications of wireless terminals. This approach may be easily implemented and have a high judgment accuracy.

Figure 3:
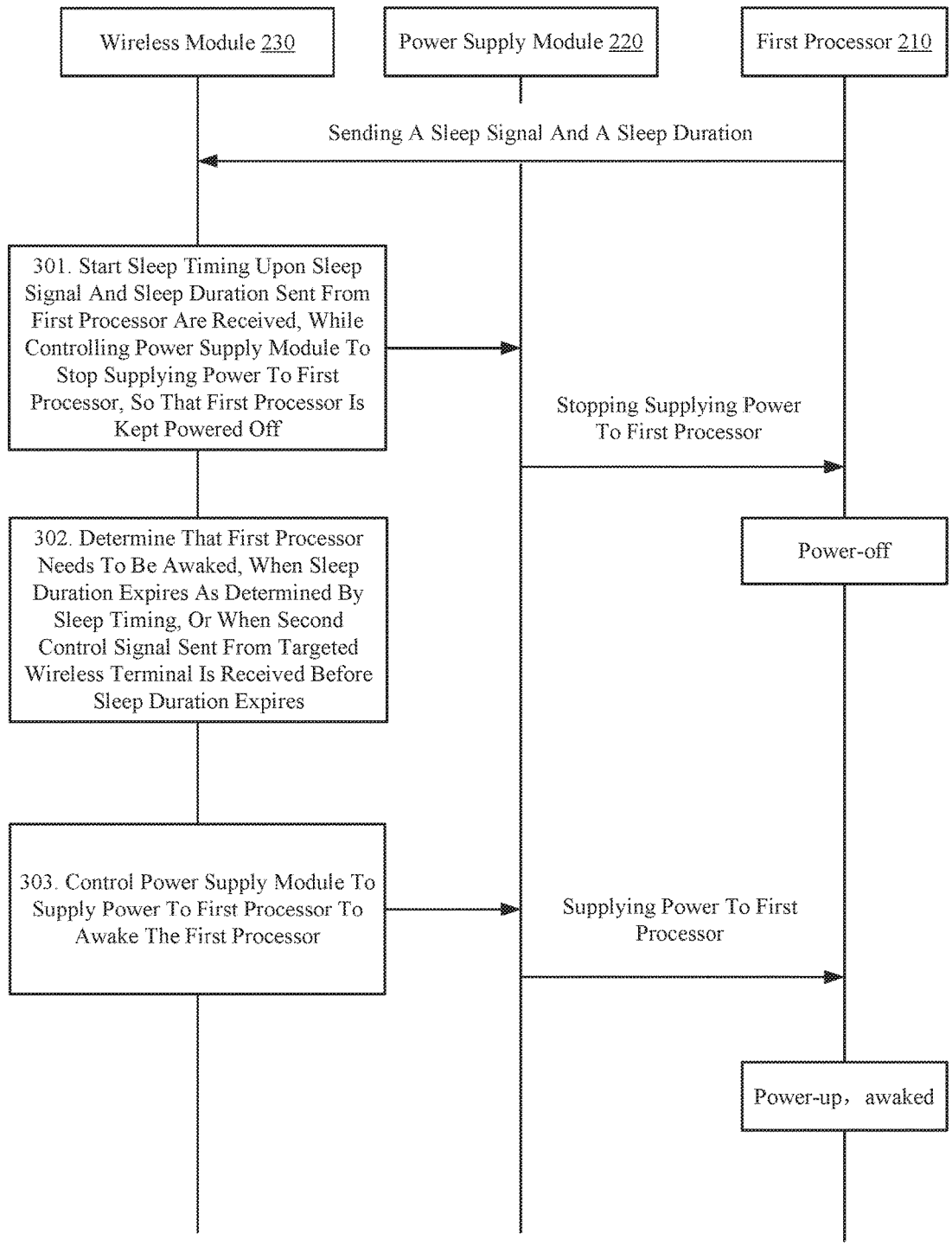
FIG. 3 is a flow chart illustrating another method for awaking electronic equipment according to an exemplary embodiment.

FIG. 3 is a flow chart illustrating another method for awaking electronic equipment 200 according to an exemplary embodiment. The method of FIG. 3 may be applied in the wireless module 230 of the electronic equipment 200 in FIG. 2B. The method further describes another process on how to monitor whether the first processor 210 needs to be awaked, and may include the following steps.

In step 301, sleep timing may be started upon a sleep signal and a sleep duration sent from the first processor 210 are received, while the power supply module 220 may be controlled to stop supplying power to the first processor 210, so that the first processor 210 is kept powered off.

In the step, the wireless module 230 may be awaked from sleep. The wireless module 230 may control the power supply module 220 to stop supplying power to the first processor 210 upon receiving the sleep signal from the first processor 210. One or more time-related events may exist for the electronic equipment 200 in the sleep state, such as an alarm clock event set by a user, an event for activating a camera at a particular time set by the user, or a calendar reminder event set by the user and so forth, which require a timing function to be in operation. In related art, typically a timer is externally provided to perform the timing function. In contrast, in step 301 of the embodiment, the first processor 210 may send the sleep duration to the wireless module 230, and the wireless module 230 may perform the timing function.

In step 302, it is determined that the first processor 210 needs to be awaked, when the sleep duration expires as determined by the sleep timing, or when a second control signal sent from a target wireless terminal is received before the sleep duration expires.

In this step, if it is determined that the sleep duration expires by the sleep timing, the first processor 210 may be needed to handle the above timing events, and thus the first processor 210 needs to be awaked. Alternatively, it is monitored whether the second control signal sent from the target wireless terminal is received before the sleep duration expires. The second control signal may be the same as, or may be different from, the first control signal. Generally, when the electronic equipment 200 is sleeping, a user may start the electronic equipment 200 by, for example, pressing a physical start button on the target wireless terminal.

In step 303, the power supply module 220 is controlled to supply power to the first processor 210 to awake the first processor 210.

For example, when the electronic equipment 200 is sleeping, the first processor 210 may inform the wireless module 230 to power off the first processor 210, and a memory connected with the first processor 210 may start self-refreshing. If a time-related event (such as an alarm clock or a reminder event set by a user) occurs, the first processor 210 may have the wireless module 230 handle the timing function for the event. The wireless module 230 may perform the timing function, after the first processor 210 is powered off, to monitor the time for the event.

When the time is up, the wireless module 230 may awake the first processor 210 by pulling up the potential of the supply lines 240 to supply power to the first processor 210. The first processor 210 upon awaked may initialize the data line(s) 250, determine that the first processor 210 is in the mode of awaking from sleeping, restore data from the memory, and then handle the time-related event. In practice, if the first processor 210 does not need to handle other events after finishing the above time-related event, the first processor 210 may be powered off by the wireless module 230 and return to the sleep state.

In an embodiment, when the first processor 210 is in the sleep state, if the second control signal is received from the target wireless terminal, it may be determined that the first processor 210 needs to be awaked. The second control signal may be an awaking signal inputted by a user via the target wireless terminal, for example, by the user's pressing a POWER button on the target wireless terminal or by the user's activating a camera of the electronic equipment 200 remotely with a smart phone. If it is determined that the first processor 210 needs to be awaked, the wireless module 230 may control the power supply module 220 to supply power to the first processor 210, so as to awake the first processor 210 to perform corresponding processes.

As can be seen from the above embodiments, when the electronic equipment 200 is sleeping, timing may be performed based on a sleep duration sent from the first processor 210; the first processor 210 may be awaked, when the sleep duration expires or when a second control signal sent from a wireless terminal is received. In the embodiment, a timing function may be performed by the wireless module 230 included in the electronic equipment 200, rather than by an additional MCU and timer; therefore, resource consumption of the equipment is reduced and costs of the equipment are reduced.

Figure 4:
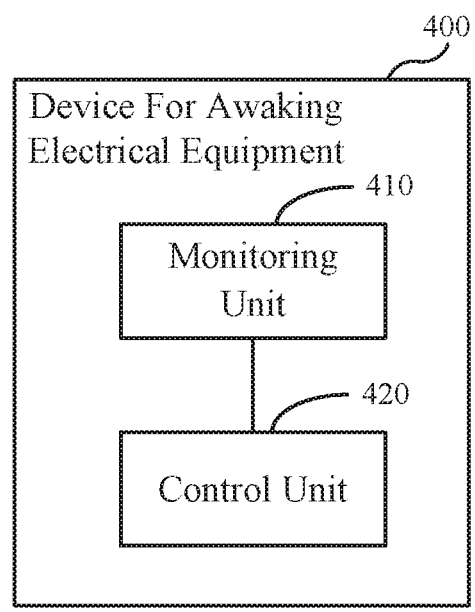
FIG. 4 is a block diagram illustrating a device for awaking electronic equipment according to an exemplary embodiment.

FIG. 4 is a block diagram illustrating a device 400 for awaking electronic equipment according to an exemplary embodiment. The device 400 may include a monitoring unit 410 and a control unit 420.

The monitoring unit 410 may be configured to monitor whether a first processor needs to be awaked, when the first processor is powered off The control unit 420 may be configured to control a power supply module to supply power to the first processor, so as to awake the first processor, if the first processor needs to be awaked.

The device 400 for awaking the electronic equipment may be included in the electronic equipment. As can be seen from the above embodiment, the device 400 may monitor whether the first processor needs to be awaked, when the first processor is powered off; and if the first processor needs to be awaked, the device 400 may control the power supply module to supply power to the first processor, so as to awake the first processor. In the embodiment, monitoring whether the first processor needs to be awaked can be performed by the device 400 included in the electronic equipment, rather than by an additionally added MCU; therefore, resource consumption of the electronic equipment is reduced and costs of the electronic equipment are reduced.

Figure 5:
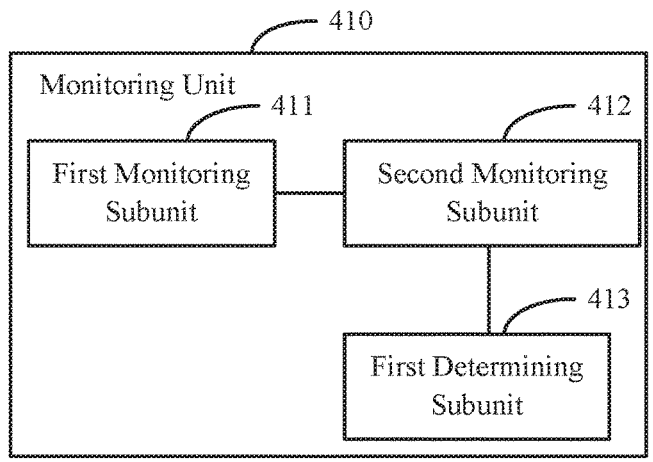
FIG. 5 is a block diagram illustrating a monitoring unit in a device for awaking electronic equipment, according to an exemplary embodiment.

FIG. 5 is a block diagram illustrating the monitoring unit 410 of FIG. 4, according to an exemplary embodiment. The embodiment is based on the embodiment shown in FIG. 4. The monitoring unit 410 may include a first monitoring subunit 411, a second monitoring subunit 412, and a first determining subunit 413.

The first monitoring subunit 411 may be configured to monitor whether a first power-up signal of the electronic equipment or a shut-down signal of the first processor is received.

The second monitoring subunit 412 may be configured to monitor whether a first control signal sent from a target wireless terminal is received, if the first power-up signal or the shut-down signal is received.

The first determining subunit 413 may be configured to determine that the first processor needs to be awaked, if the first control signal sent from the target wireless terminal is received.

As can be seen from the above embodiment, when the electronic equipment is powered up after powered off, or after the electronic equipment is shut down, the device 400 may monitor a first control signal for controlling start of the processor of the electronic equipment, and may control the processor of the electronic equipment to start to work normally. In the embodiment, it is not necessary to add an MCU into the electronic equipment; therefore, resource consumption of the equipment is reduced and costs of the equipment are reduced.

Figure 6:
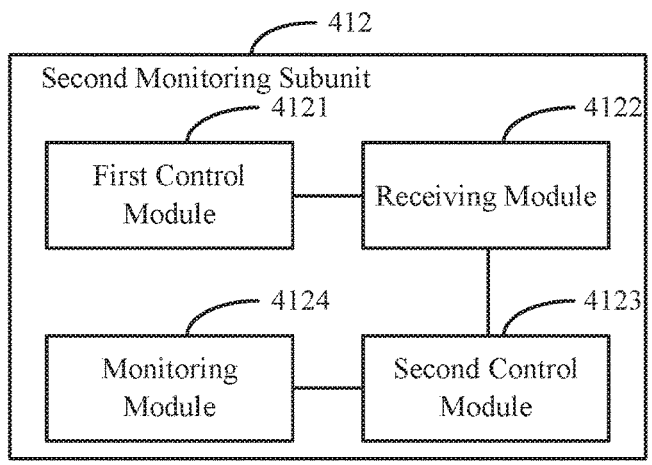
FIG. 6 is a block diagram illustrating a monitoring subunit in a device for awaking electronic equipment according to an exemplary embodiment.

FIG. 6 is a block diagram illustrating the second monitoring subunit 412 of FIG. 5, according to an exemplary embodiment. The embodiment is based on the embodiment shown in FIG. 5. The second monitoring subunit 412 may include a first control module 4121, a receiving module 4122, a second control module 4123, and a monitoring module 4124.

The first control module 4121 may be configured to control the power supply module to supply power to the first processor.

The receiving module 4122 may be configured to receive an executable file for a control system of a wireless module, sent from a first processor after being supplied with the power.

The second control module 4123 may be configured to control the power supply module to stop supplying power to the first processor after the executable file is received.

The monitoring module 4124 may be configured to update the control system of the wireless module with the executable file, and monitor, by the control system of the wireless module, whether the first control signal sent from the targeted wireless terminal is received.

As can be seen from the above embodiment, a latest executable file may be sent to the device 400 upon the electronic equipment is shut down or the electronic equipment is re-powered up, and the device 400 may be updated and run in a better state.

Figure 7:
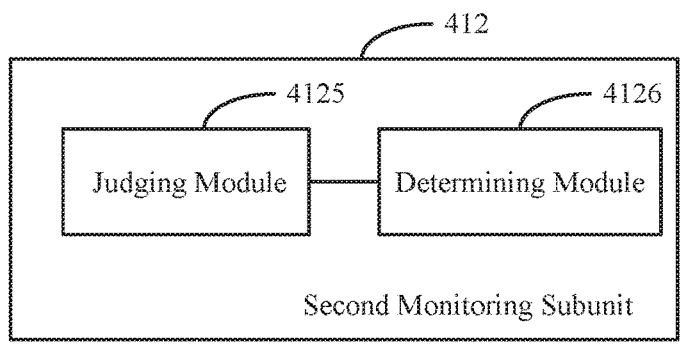
FIG. 7 is a block diagram illustrating a monitoring subunit in a device for awaking electronic equipment according to another exemplary embodiment.

FIG. 7 is a block diagram illustrating the second monitoring subunit 412 of FIG. 5, according to another exemplary embodiment. The embodiment is based on the embodiment shown in FIG. 5. The second monitoring subunit 412 may include a judging module 4125 and a determining module 4126.

The judging module 4125 may be configured to judge, when a first control signal sent from a wireless terminal is received, whether the received first control signal is sent from an associated wireless terminal.

The determining module 4126 may be configured to determine that the first control signal sent from the targeted wireless terminal is received, if the received first control signal is sent from the associated wireless terminal.

As can be seen from the above embodiment, when the first control signal of the wireless terminal is received, it can be judged whether the wireless terminal is an associated wireless terminal, and only an associated wireless terminal can awake the first processor. Therefore, security of the electronic equipment is improved.

Figure 8:
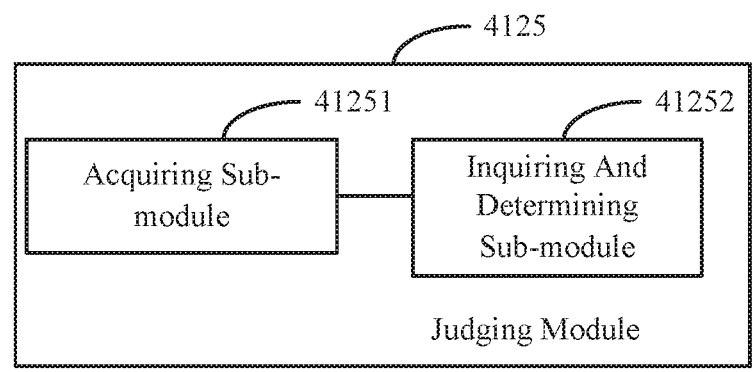
FIG. 8 is a block diagram illustrating a judging module in a device for awaking electronic equipment according to an exemplary embodiment.

FIG. 8 is a block diagram illustrating the judging module 4125 of FIG. 7, according to an exemplary embodiment. The embodiment is based on the embodiment shown in FIG. 7. The judging module 4125 may include an acquiring sub-module 41251 and an inquiring and determining sub-module 41252.

The acquiring sub-module 41251 may be configured to acquire a wireless terminal identification carried in the received first control signal.

The inquiring and determining sub-module 41252 may be configured to inquire whether the wireless terminal identification is recorded in a preset list of equipment, and to determine that the received first control signal is sent from the associated wireless terminal, if the wireless terminal identification is recorded in the preset list of equipment.

As can be seen from the above embodiment, identifications of wireless terminals are recorded in a pre-stored list for equipment; whether the first control signal is sent from an associated wireless terminal may be judged based on the identifications of wireless terminals. This approach may be easily implemented and have a high judgment accuracy.

Figure 9:
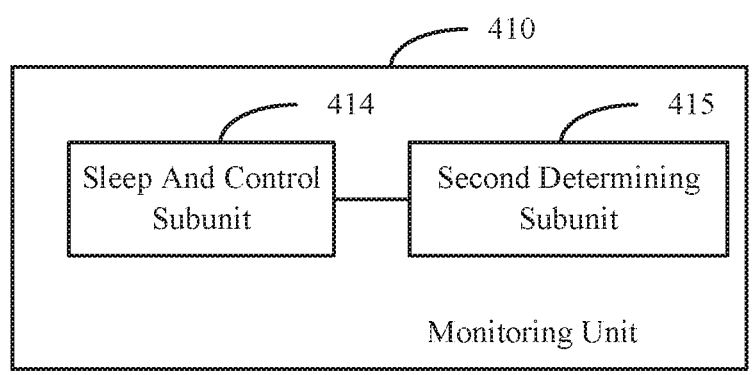
FIG. 9 is a block diagram illustrating a monitoring unit in a device for awaking electronic equipment according to another exemplary embodiment.

FIG. 9 is a block diagram illustrating the monitoring unit 410 of FIG. 4, according to another exemplary embodiment. The embodiment is based on the embodiment shown in FIG. 4. The monitoring unit 410 may include a sleep and control subunit 414 and a second determining subunit 415.

The sleep and control subunit 414 may be configured to start sleep timing upon a sleep signal and a sleep duration sent from the first processor are received, while controlling the power supply module to stop supplying power to the first processor, so that the first processor is kept powered off.

The second determining subunit 415 may be configured to determine that the first processor needs to be awaked, when the sleep duration expires as determined by the sleep timing, or when a second control signal sent from a targeted wireless terminal is received before the sleep duration expires.

As can be seen from the above embodiment, when the electronic equipment is sleeping, timing may be performed based on a sleep duration sent from the first processor; the first processor may be awaked, when the sleep duration expires or when a second control signal sent from a wireless terminal is received. In the embodiment, a timing function may be performed by the wireless module included in the electronic equipment, rather than by an additionally added MCU and timer; therefore, resource consumption of the equipment is reduced and costs of the equipment are reduced.

Electronic equipment is further provided in the embodiment, including a first processor, a power supply module, and a wireless module; the wireless module includes a second processor and a memory for storing instructions executable by the second processor; wherein the second processor is configured to: monitor whether the first processor needs to be awaked, when the first processor is powered off and control the power supply module to supply power to the first processor, so as to awake the first processor, if the first processor needs to be awaked.

Processes for implementing the functions and effects of each of the units in the above device may be found with reference to the processes for implementing corresponding steps in the above methods for details, and are omitted herein.

For the device embodiments, reference may be made to the description of the corresponding method embodiments. The above described device embodiments are only examples. The units described as discrete components may be or may not be physically separated; the components shown as units may be or may not be physical units, i.e., they may be located in a single place or be distributed to a plurality of network units. A part or all of the modules may be selected to achieve purposes of the disclosure as actually needed. Those of ordinary skills in the art may understand and implement the disclosure, without creative work.

Figure 10:
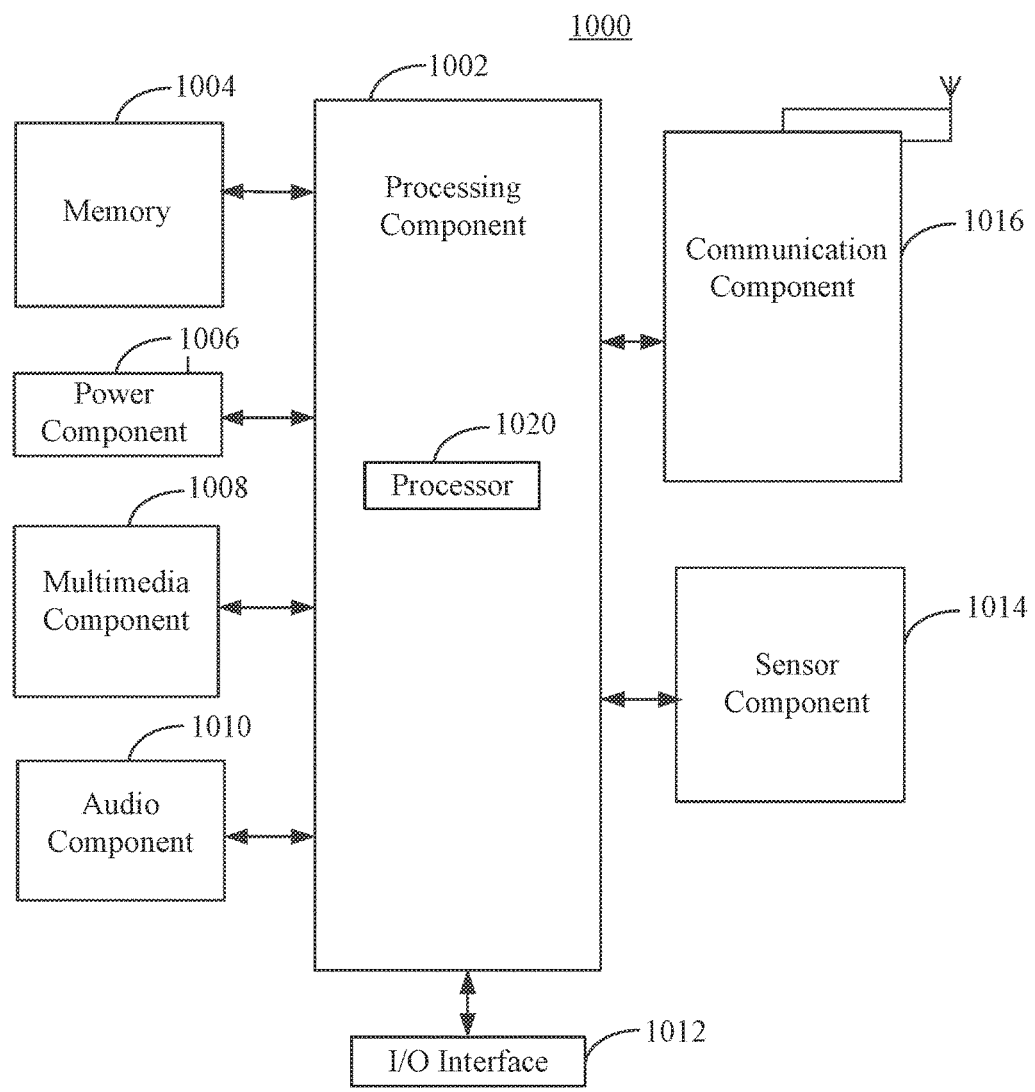
FIG. 10 is a block diagram illustrating a device for awaking electronic equipment according to an exemplary embodiment.

FIG. 10 is a block diagram illustrating a device 1000 for awaiting electronic equipment according to an exemplary embodiment. For example, the device 1000 may be a mobile phone, a computer, a digital broadcast terminal, a messaging device, a gaming console, a tablet, a medical device, exercise equipment, a personal digital assistant, and the like.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 may typically control overall operations of the device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 may be configured to store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power for the device 1000.

The multimedia component 1008 may include a screen providing an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia datum while the device 1000 is in an operation mode, such as a photographing mode or a video mode Each of the front camera and the rear camera may be a fixed optical lens system or have optical focusing and zooming capability.

The audio component 1010 may be configured to output and/or input audio signals. For example, the audio component 1010 includes a microphone configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, the peripheral interface modules being, for example, a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 may detect an open/closed status of the device 1000, relative positioning of components (e.g., the display and the keypad, of the device 1000), a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of a nearby object without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 may be configured to facilitate communication, wired or wirelessly, between the device 1000 and other devices. The device 1000 can access a wireless network based on a communication standard, such as WiFi, 2G; or 3G or a combination thereof In an exemplary embodiment, the communication component 1016 receives a broadcast signal or broadcast associated information from an external broadcast management system via a broadcast channel. In an exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1004, executable by the processor 1020 in the device 1000, for performing the above-described methods. For example, the non-transitory computer-readable storage medium may be a ROM, a RAM, a CD-ROM, a magnetic tape, a floppy disc, an optical data storage device, and the like.

In exemplary embodiments, there is also provided anontransitory computer readable storage medium having stored therein instructions, such as included the memory 1004, executable by the processor 1020 of the device 1000, for performing the above described methods for awaking electronic equipment. For example, the non-transitory computer-readable storage medium may be a ROM, a RAM, a CD-ROM, a magnetic tape, a floppy disc, an optical data storage device, and the like.

One of ordinary skill in the art will understand that the above-described modules/units can each be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/subunits.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

The above description only relates to embodiments of the disclosure, and is not intended to limit the disclosure. Any modifications, equivalently substitutions and improvements made within the spirit and principle of the disclosure should be considered to be included in the scope of the disclosure.

What is claimed is:

1. A method for awaking electronic equipment including a wireless module connected with a first processor and a power supply module, the method comprising:
monitoring, by the wireless module, whether the first processor needs to be awaked, when the first processor is powered off; and
controlling, by the wireless module, the power supply module to supply power to the first processor to awake the first processor, if it is determined that the first processor needs to be awaked,
wherein the monitoring whether the first processor needs to be awaked comprises:

monitoring whether a power-up signal of the electronic equipment is received when the first processor is powered off, wherein the power-up signal of the electronic equipment is received when a power distribution network of the electronic equipment is re-powered up after power-off or when a power plug of the electronic equipment is re-plugged in a socket after being pulled out from the socket;

monitoring whether a control signal sent from a target wireless terminal is received, if the power-up signal is received when the first processor is powered off; and determining that the first processor needs to be awaked, if the control signal sent from the target wireless terminal is received.

2. The method of claim 1, wherein the monitoring whether the control signal sent from the target wireless terminal is received comprises:

receiving, from the first processor when being supplied with power by the power supply module, an executable file for a control system of the wireless module;

controlling the power supply module to stop supplying power to the first processor, after the executable file is received; and updating the control system of the wireless module with the executable file, and monitoring, by the control system of the wireless module, whether the control signal sent from the target wireless terminal is received.

3. The method of claim 1, wherein the monitoring whether the control signal sent from the target wireless terminal is received comprises:

when a first control signal sent from a wireless terminal is received, judging whether the received first control signal is sent from an associated wireless terminal; and determining that the control signal sent from the target wireless terminal is received, if the received first control signal is sent from the associated wireless terminal.

4. The method of claim 3, wherein the judging whether the received first control signal is sent from the associated wireless terminal comprises:

acquiring a wireless terminal identification carried in the received first control signal;

inquiring whether the wireless terminal identification is recorded in a preset list of equipment; and determining that the received first control signal is sent from the associated wireless terminal, if the wireless terminal identification is recorded in the preset list of equipment.

5. The method of claim 1, wherein the monitoring whether the first processor needs to be awaked further comprises:

upon receiving a sleep signal and a sleep duration sent from the first processor, starting sleep timing and controlling the power supply module to stop supplying power to the first processor so that the first processor is kept powered off; and determining that the first processor needs to be awaked, when the sleep duration expires as determined by the sleep timing, or when a control signal sent from a target wireless terminal is received before the sleep duration expires.

6. A wireless module included in electrical equipment, the electrical equipment further including a first processor and a power supply module, the wireless module comprising:

a second processor and a memory for storing instructions executable by the second processor;

wherein the second processor is configured to:

monitor whether the first processor needs to be awaked, when the first processor is powered off; and control the power supply module to supply power to the first processor to awake the first processor, if it is determined that the first processor needs to be awaked, wherein the second processor is further configured to:

monitor whether a power-up signal of the electronic equipment is received when the first processor is powered off, wherein the power-up signal of the electronic equipment is received when a power distribution network of the electronic equipment is re-powered up after power-off or when a power plug of the electronic equipment is re-pluqqed in a socket after being pulled out from the socket;

monitor whether a control signal sent from a target wireless terminal is received, if the power-up signal is received when the first processor is powered off; and determine that the first processor needs to be awaked if the control signal sent from the target wireless terminal is received.

7. The wireless module of claim 6, wherein the second processor is further configured to:

receive, from the first processor when being supplied with power by the power supply module, an executable file for a control system of the wireless module;

control the power supply module to stop supplying power to the first processor, after the executable file is received; and update the control system of the wireless module with the executable file, and monitor, by the control system of the wireless module, whether the control signal sent from the target wireless terminal is received.

8. The wireless module of claim 6, wherein the second processor is further configured to:

judge, when a first control signal sent from a wireless terminal is received, whether the received first control signal is sent from an associated wireless terminal; and determine that the control signal sent from the target wireless terminal is received, if the received first control signal is sent from the associated wireless terminal.

9. The wireless module of claim 8, wherein the second processor is further configured to:

acquire a wireless terminal identification carried in the received first control signal;

inquire whether the wireless terminal identification is recorded in a preset list of equipment; and determine that the received first control signal is sent from the associated wireless terminal, if the wireless terminal identification is recorded in the preset list of equipment.

10. The wireless module of claim 6, wherein the second processor is further configured to:

upon receiving a sleep signal and a sleep duration sent from the first processor, start sleep timing and control the power supply module to stop supplying power to the first processor so that the first processor is kept powered off; and determine that the first processor needs to be awaked, when the sleep duration expires as determined by the sleep timing, or when a control signal sent from a target wireless terminal is received before the sleep duration expires.

11. A non-transitory computer-readable storage medium having stored therein instructions that, when executed by a second processor of a wireless module connected with a first processor and a power supply module in electronic equipment, cause the second processor to perform the method of claim 1.

12. Electrical equipment, comprising:
- a wireless module; and
- a first processor and a power supply module each connected with the wireless module;
- wherein the wireless module includes a second processor configured to:
  - monitor whether the first processor needs to be awaked, when the first processor is powered off; and
  - control the power supply module to supply power to the first processor to awake the first processor, if it is determined that the first processor needs to be awaked,
  - wherein to monitor whether the first processor needs to be awaked, the second processor is configured to:
    - monitor whether a power-up signal of the electronic equipment is received when the first processor is powered off, wherein the power-up signal of the electronic equipment is received when a power distribution network of the electronic equipment is re-powered up after power-off or when a power plug of the electronic equipment is re-plugged in a socket after being pulled out from the socket;
    - monitor whether a control signal sent from a target wireless terminal is received, if the power-up signal is received when the first processor is powered off; and
    - determine that the first processor needs to be awaked, if the control signal sent from the target wireless terminal is received.

\* \* \* \* \*